United States Patent [19]

Swanson

[11] 3,793,829
[45] Feb. 26, 1974

[54] HYDRAULIC BOOSTER WITH PEDAL TRAVEL CONTROL

[75] Inventor: Kenneth B. Swanson, Bannister, Mich.

[73] Assignee: Midland-Ross Corporation, Cleveland, Ohio

[22] Filed: Oct. 2, 1972

[21] Appl. No.: 293,920

[52] U.S. Cl. ............... 60/547, 91/170 R, 91/173, 92/65
[51] Int. Cl. ........ F15b 7/00, F01b 7/00, F01b 7/10
[58] Field of Search ........ 60/54.5 R, 54.5 P, 54.6 P; 91/391 R, 170 R, 173; 92/61, 65; 188/359

[56] References Cited
UNITED STATES PATENTS

| | | |
|---|---|---|
| 2,959,132 | 11/1960 | Chappelle .................... 60/54.5 R |
| 3,106,874 | 10/1963 | Schultz ......................... 60/54.6 P |
| 3,354,641 | 11/1967 | Helvern ......................... 60/54.6 P |
| 3,140,586 | 7/1964 | Joelson ......................... 60/54.5 R |

*Primary Examiner*—Martin P. Schwadron
*Assistant Examiner*—A. M. Zupic

[57] ABSTRACT

A hydraulically operated booster brake mechanism which operates in response to movement of the brake pedal to produce braking when hydraulic pressure or power is available to assist such braking and also in the absence of such pressure and in which the ratio of pedal travel required at the foot pedal to afford displacement of the piston in the brake producing master cylinder is at one value when hydraulic pressure is available to assist braking and at another value in the absence of hydraulic pressure when braking must be produced by physical effort of the operator.

11 Claims, 1 Drawing Figure

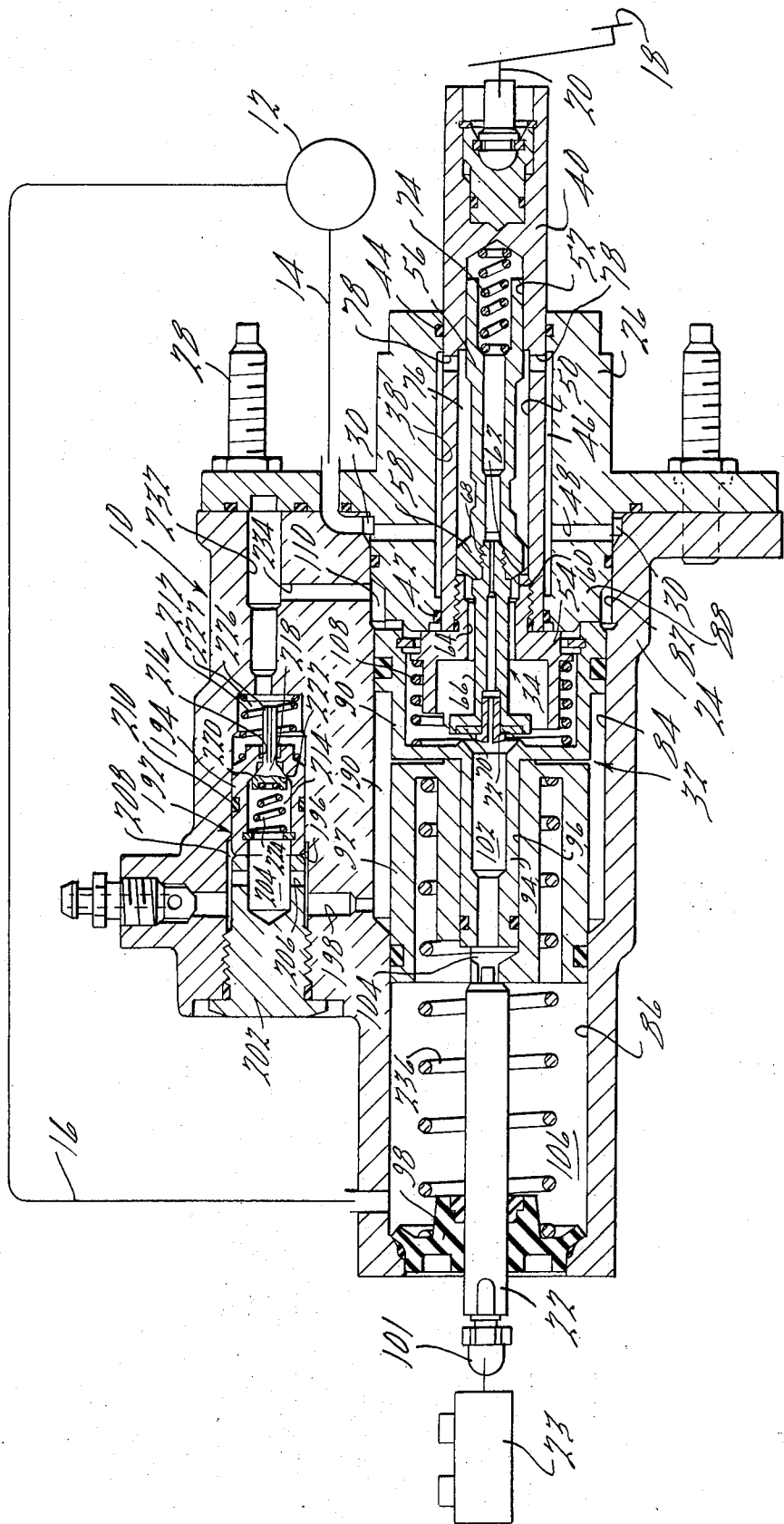

HYDRAULIC BOOSTER WITH PEDAL TRAVEL CONTROL

SUMMARY OF THE INVENTION

This invention relates to hydraulic booster mechanisms and more particularly to such a mechanism affording a relatively short pedal stroken when hydraulic pressure is available to assist braking and a greater pedal stroke is available in the absence of such pressure when braking must be produced by physical effort by the operator.

Operators of vehicles have been accustomed to brake pedal ratios affording a mechanical advantage of 3:1, that is, a three inch movement or travel of the pedal results in one inch of movement of the hydraulic fluid displacing piston of the master cylinder. To comply with more stringent safety requirements particularly relative to stopping distances which must be accomplished by the braking systems of vehicles when power is unavailable to assist braking, it has been found necessary to increase the pedal ratio, for example, to 4:1. Such an increase is of assistance when power is unavailable but results in undesirable and unpleasant sensation when the braking is assisted by power because the pedal stroke is longer than is customary and familiar to operators of vehicles.

Various mechanisms have been proposed to accommodate this problem, most of which have to do with changing the position of the pedal from one position when hydraulic pressure or power is available to a different and higher position relative to the floor board of the vehicle when power is unavailable. This results in two different starting positions of the pedal which is undesirable particularly when the new and higher position of the pedal must be found by the foot of the operator under an unusual situation when power fails. Still other arrangements utilize mechanical levers to provide different ratios in the presence or absence of power. Such lever arrangements, however, are subject to various problems of friction and critical spacing of pivot points which affects the proper response of the brake unit.

An object of the invention is to provide a hydraulic booster brake mechanism which is operated under one ratio of pedal movement or travel when power is available to assist braking and at a greater ratio of pedal movement in the absence of power.

Another object of the present invention is to provide a hydraulically actuated brake booster mechanism which affords the advantage of the customary pedal movement when power is available and a greater movement of the pedal when the braking must be accomplished solely by physical force.

Another object of the present invention is to provide for manual actuation of the brake booster without loss of any portion of the physical effort.

A further object of the invention is to provide a hydraulically actuated brake booster mechanism which may be operated by physical force of the operator after runout is reached without loss of a portion of the physical force thereafter applied.

It is still another object of the invention to provide an improved hydraulic booster brake mechanism that is economical and commercially feasible to manufacture and which will comply with test and operating requirements of safety legislation.

The above as well as other objects and advantages of the present invention will become apparent from the following description, the appended claims and the accompanying drawings disclosing a preferred embodiment of the invention.

BRIEF DESCRIPTION OF THE DRAWINGS

The drawing is a longitudinal, sectional view of a hydraulic booster brake mechanism embodying the invention with some associated components shown schematically.

DETAILED DESCRIPTION

Referring to the drawing, a hydraulic booster brake mechanism 10 is adapted to receive hydraulic pressure from a source schematically depicted at 12 through a line 14 and to return hydraulic fluid to the source by way of a return line 16. The source may be part of a hydraulic circuit such as a power steering system of a vehicle or it may be part of a separate hydraulic circuit employing a separate pump. The source may incorporate an accumulator and may be of either the open center or the closed center type. For an understanding of the present invention it is necessary only to consider that hydraulic pressure can be supplied to the booster brake mechanism 10 by any one of a number of different and conventional hydraulic circuits.

The booster brake mechanism 10 is actuated through a foot pedal 18 which moves an input member 20 to control operation of the power brake unit which results in movement of an output member 22 to operate a conventional hydraulic master cylinder 23 forming a part of a conventional hydraulic brake system.

The booster brake mechanism 10 includes a housing made up of a forward housing section 24 to which the master cylinder 23 is attached in any conventional manner and a rearward cover plate and housing section 26 which is provided with studs 28 by which the entire housing assembly and master cylinder 23 may be mounted conventionally within the engine compartment of a vehicle. The housing sections 24 and 26 are held together in fluid tight relationship and form an annular chamber 30 which receives hydraulic fluid from the source 12 through the line 14.

The forward housing section 24 of the booster brake mechanism 10 slidably receives a power piston assembly generally designated at 32. Hydraulic fluid which is delivered through the line 14 to the chamber 30 is under the control of a follow-up valve 34. The follow-up valve 34 is actuated by movement of the input member 20 so that upon movement of the pedal 18 for application of the brakes, pressure within the housing 24, 26 at the right end of the piston assembly 32 is increased causing the piston assembly to move to the left and to apply force to the output member 22 which in turn actuates the master cylinder 23 for application of the brakes.

The rearward housing section 26 has a longitudinally extending bore 38 which slidably receives a generally tubular control member 40. The bore 38 has reduced diameter portions at its opposite ends in which seals 42 and 44 are in position to engage the outer surface of the control member 40 in a fluid tight but slidable relationship. The enlarged portion of the bore 38 between the seals 42 and 44 forms an annular cavity 46 around the exterior of the control member 40 which receives hydraulic fluid from the supply chamber 30 through radially extending passages 48.

The right end of the control member 40, as seen in the drawing, is adapted to be connected to the input member 20 so that movement of the brake pedal 18 is effective to move the control member 40. The opposite end of the control member 40 is formed with an elongated blind bore having a bore portion 50 and a smaller bore portion 52. The left end of the bore 50 is partially closed by a generally cup-shaped member 54 which is threaded into the end of the control member 40 in fluid tight relation thereto. A valve control rod assembly 56 is supported for sliding movement within the bore 50, 52. The right end of the valve rod assembly 56 is slidably supported in the small bore portion 52 and an intermediate portion is provided with an enlarged, fluted head 58 which slidably engages the enlarged bore portion 50 but permits the passage of fluid. The enlarged head 58 is provided with a tapered face 60 which is adapted to engage an annular shoulder 62 formed at the right end of the head portion 54 and within the bore 50. The tapered face 60 and the annular shoulder 62 form the inlet valve of the booster brake mechanism 10 controlling the flow of fluid in a passage 64 in the head 58. A mushroom shaped valve member 66 has a stem portion 68 threaded into the head 58 and the opposite end is provided with a seal 70 which is adapted to engage an annular valve seat 72 in the piston assembly 32. The seal 70 and the annular valve seat 72 form the exhaust valve portion of the follow-up valve mechanism 34.

The valve rod assembly 56 is adapted to slide relative to the control member 40 and is continuously urged to the left by a spring 74 acting between the end of the small bore portion 52 and the valve rod 56 and normally functions to maintain the inlet valve 60, 62 in a closed position as shown in the drawing. The valve rod 56 acts with the bore 50 to form an annular fluid cavity 76 which is in communication with the cavity 46 by means of radial passages 78. Hydraulic fluid supplied to the annular supply chamber 30 is made available in the cavity 76 and at the inlet valve 60, 62 by way of radial passages 48, the annular cavity 46 and the radial passages 78.

The forward housing portion 24 is provided with a stepped bore having a large bore portion 82, an intermediate bore 84 and a small bore 86. The large bore 82 receives a cylindrical portion 88 of the rear housing section 26. Also received in the stepped bore is the piston assembly 32 made up of two pistons, namely, a large diameter, power piston 90 slidable in the intermediate bore 84 and a smaller diameter output piston 92 slidable in the small bore 86. The power piston 90 is generally cup-shaped and has a forward extending, hollow rod portion 94 which is slidably supported in a central bore 96 of the output piston 92. The output piston 92 is connected to the end of the output rod 22 and the latter has its intermediate portion slidably supported in a seal and bearing member 98 in the end wall of the forward housing section 24. The end of the output rod 22 is provided with a spherical stud 101 threaded into the rod 46 which permits adjustment between the master cylinder piston (not shown) of the master cylinder 23 mounted on the end of the forward housing section 24.

The rod portion 94 of the power piston 90 has an axial passage 102 by which the cavities formed at the opposite ends of the piston assembly 32 are placed in communication with each other. The left end of the passage 102 communicates with the left end of the central bore 96 in the output piston 92 and a radial opening 104 communicates the bore 96 with an exhaust chamber 106 formed by the housing bore 86 and piston assembly 32. The right end of the passage 102 is open to the annular valve seat 72 formed within the cup-shaped power piston 90.

Movement of the control member 40 to the left from the position shown in the drawing is against the resistance of a spring 108 having its opposite ends acting against the power piston 90 and the cup-shaped member 54, respectively. During such movement, the valve rod 56 moves as a unit with the control member 40 until the seal or exhaust valve element 70 engages and closes the exhaust valve seat 72 after which additional movement of the valve rod 56 is interrupted and further movement of the control member 40 causes the stationary valve rod 56 to compress the spring 74 and the tapered inlet valve 60 separates from the annular valve seat 62 to open the inlet valve assembly. Opening of the inlet valve makes hydraulic fluid under pressure in the cavity 76 available to a power chamber 110 formed to the right of the power piston 90. Upon the introduction of fluid under pressure to the power chamber 110, the piston assembly 32 is moved to the left to actuate the master cylinder 23 and apply the brakes.

The piston assembly 32 of the power brake mechanism 10 includes the power piston 90 disposed in sealing engagement with the bore 84 and the relatively movable output piston 92 which is in sealing engagement with the smaller bore 86. The space in the bore 84 between the power piston 90 and the output piston 92 forms a pedal travel control cavity 190 which is used for the purpose of controlling the ratio of travel of the pedal 18 to travel of the output rod 22 in a manner to be more fully described.

The fluid volume and pressure in the cavity 190 is controlled by a travel ratio control valve 192 which includes a piston member 194 slidably mounted in a stepped bore 196 communicating by way of a radial passage 198 with the control cavity 190. The left end of the bore 196 is closed by a plug 202 which is threaded into the forward housing section 24 and sealed relative thereto. The plug element 202 has a recess 204 which communicates by way of radial passages 206 with an annular chamber 208 formed in the bore 196.

The piston 194 of the ratio control valve assembly 192 is slidably mounted in the bore 196 and is sealed relative thereto by a seal 210. The piston 194 is urged to the left into abutting engagement with the plug element 202 by a spring 212 having one end seated against the piston 194 and its opposite end seated against the end wall of the bore or cylinder 196. The piston 194 has a longitudinally extending bore forming a chamber 214 which, in the position shown in the drawing, opens to the recess 204 in the plug element 202. The chamber 214 communicates with a chamber 227 at the right end of the piston 194 by an opening 216 which is under the control of a valve element 218. The valve element 218 is provided with a conical head portion 220 adapted to seat on the shoulder 222 under the urging of a spring 224 which is seated in the chamber 214 and biases the valve element 218 to the right as seen in the drawing. A fluted stem portion 226 projects from the head portion 220 through the opening 216 and is adapted upon movement of the piston 194 to the right to engage the end of the wall of the bore 196 and to unseat the conical head 220 from the shoulder 222 to open the passage or opening 216. The chamber 227 at the right side of the piston 194, as viewed in the drawings, communicates with an axial passage 232 and a radial passage 234 with the power chamber 110 at the right side of the piston assembly 32. The cavity 204 to the left of the seal 210 of the piston 194 communicates with the ratio chamber 190 as previously described.

The ratio valve 192 is normally in its closed position as illustrated in the drawing with the piston 194 engaged with the plug 202. However, when the pressure in the ratio chamber 190 increases to a pressure greater than the pressure in the power chamber 110, differential pressure acting on the seal 210 moves the piston 194 to the right causing the stem 226 to engage the end wall of the bore 196 and open the valve 218 to permit fluid to escape from the chamber 190 to the power chamber 110. On the other hand, under conditions in which the pressure in the power chamber 110 is greater than in the ratio chamber 190, the differential in pressure acts on the conical head 220 of the valve element 218 against the action of the spring 224 and opens the passage 216 to admit fluid from the power chamber 110 to the ratio chamber 190.

OPERATION

When the booster brake mechanism 10 is in an unapplied or brake released condition, the various components occupy the position shown in the drawing and the entire booster mechanism 10 is filled with hydraulic fluid. The pressure of the hydraulic fluid in the supply chamber 30 is at the pressure of the source and, as a consequence, is made available in the cavity 76 at the inlet valve 60, 62 of the follow-up valve mechanism 34. The remainder of the power brake mechanism and its various passages and cavities is at return pressure, that is, a minimum pressure to the order of approximately 5 psi or less and is permitted to flow from the booster mechanism 10 through the return line 16 to the source 12.

When a brake application is to be made, a force applied to the brake pedal 18 is transmitted through the input rod 20 to cause movement of the control member 40 to the left. Such movement compresses the spring 108 and the control member 40 and the valve rod 56 move as a unit toward the power piston 90 until the exhaust valve element 70 engages the exhaust valve seat 72 to close the passage formed by the axial bore 102 communicating with the return chamber 106. Subsequent travel of the control member 40 to the left is made relative to the stationary valve rod 56 causing the spring 74 at the right end of the valve rod 56 to be compressed and the tapered face 60 of the valve head to separate from the valve seat 62 thereby admitting the pressure from the chamber 76 in the control member 40 to the power chamber 110 formed at the right of the power piston 90. The increase in pressure in the power chamber 110 will cause the power piston assembly 32 to move to the left because of the lesser pressure in the cavity 106 to the left of the piston assembly.

To insure continued movement of the piston assembly 32, by increase in pressure in the power chamber 110, the control member 40 must also be moved to maintain the exhaust valve 70, 72 closed and the inlet valve 60, 62 open. It is for this reason that the valve arrangement is referred to as the follow-up valve, that is, the movement of the valve mechanism must follow the movement of the power piston assembly 32 in order to maintain the exhaust valve closed and the inlet valve open to continue increasing the pressure in the power chamber 110.

As the piston assembly 32 moves to the left in response to a pressure increase in the power chamber 110, the same pressure is communicated through passages 232 and 234 to act on the right side of the seal 210 of the pedal ratio valve 192. This pressure together with the force of the spring 212 acts to maintain the piston 194 against the plug element 202. As a result, fluid in the cavity 190 is isolated from the remainder of the fluid in the booster brake mechanism 10. Although isolated, the cavity 190 will contain fluid at the same pressure as the pressure in the control or power chamber 110 to the right of the power piston 90. This condition exists because the pistons 90 and 92 are independent of each other and the force due to pressure acting on piston 90 is transmitted to the fluid trapped in the cavity 190. Upon an increase in pressure in the power chamber 110 to the right of the power piston 90 and with the cavity 190 isolated, leftward movement of the power piston 90 is transmitted to the smaller output piston 92 by way of the hydraulic fluid in the cavity 190. The diameter of the power piston 90 is greater than the diameter of the output piston 92 and, as the power piston 90 moves to the left, a constant volume of fluid is maintained in the cavity 190 so that for every increment of movement of the power piston 90 to the left, there is a larger increment of movement of the output piston 92. The net result is that the movement of the output member 22 is greater than the movement of the input member 20 making only a small amount of movement of the pedal 18 necessary to achieve power braking.

After the power piston assembly 32 begins movement to the left in a brake applying direction and after the desired degree of braking has been achieved, the addition of force to the pedal 18 is discontinued but maintained. As a result, the power piston 90 and the control rod 56 will move to the left an additional increment relative to the stationary control member 40 to permit closing of the inlet valve 60, 62 while maintaining the exhaust valve 70, 72 closed. This is the lap condition of the power brake unit in which the brake will be held at a selected degree of actuation. Additional braking may be achieved by adding a greater force to the brake pedal 18 to move the control member 40 to the left or the brake may be released by relieving manual effort from the pedal brake 18 to permit the control member 40 to return to the right.

After the desired degree of braking is achieved, release of the brakes is accomplished by relieving the force on the pedal 18 which allows the control member 40 to move to the right relative to the power piston 90 under the urging of spring 108. Initially, the inlet valve 60, 62 closes under the urging of spring 74 after which the exhaust valve 70 separates from the valve seat 72 and opens the passage 102 permitting fluid under pressure in the power chamber 110 to escape to the return chamber 106 and through the return line 16 back to the pressure source 12. As the pressure in the power chamber 110 decreases, the pressure in the cavity 190 between the pistons 90 and 92 also decreases to the same level and as the power piston assembly 32 moves to the right, the output piston 92 is moved under the urging of a return spring 236 in the exhaust chamber 106. Such movement maintains a constant volume of fluid in chamber 190 and permits the pistons to move toward each other. In other words, movement of the power piston 90 to the right makes more of the larger bore 84 available for fluid and the output piston 92 returns a greater distance than the power piston 90 to maintain the fluid isolated in chamber 190 at a constant volume. When power piston 90 reaches its original position, as shown in the drawing, the output piston 92 will also be in the position shown, that is, in engagement with the power piston 90.

During application of the brakes, if the maximum pressure available from the source 12 is utilized, no further pressure is available to move the power piston 94 and the output piston 96 to the left to apply the brakes. This is known as the runout point and any additional braking which is to be achieved must be accomplished by the addition of physical force applied by the operator to the pedal 18 through the input rod 20 to the control member 40. Physical force applied to the control member 40 tending to move it to the left will compress the spring 108 and allow cup-shaped member 54 to contact the power piston 90. Thereafter, the physical force applied to the pedal 18 will be transmitted directly to the power piston 90 causing it to transmit force toward the left and to increase the pressure in the cavity 190 while the pressure in the power chamber 110 remains constant. This will cause the piston 194 of the ratio valve assembly 192 to move toward the right until stem 226 engages the end wall of the cylinder 196 and unseats valve element 218 from the opening 216 to permit the fluid in chamber 190 which is at a relatively high pressure to flow to and equalize the pressure in the power chamber 110. As a result, if sufficient physical force is applied to pedal 18, the power piston 90 will move into engagement with the output piston 92. Thereafter, leftward movement of the control member 40 is transmitted directly to the power piston 90 and output piston 92 so that the pistons move as a unit and transfer such movement to the output rod 22 and to the master cylinder 23 for applying the brakes of the vehicle.

When the power brake unit 10 is operated beyond the runout condition in which the piston assembly 32 has been moved toward the right end of chamber 106 and the power piston 90 and the output piston 92 are in contact with each other, the volume of fluid in chamber 190 will have been decreased. Upon release of the booster brake 10 from this condition, the force of the pressure in power chamber 110 as well as the physical force will be removed and the piston assembly 32 will move to the right under urging of a return spring 236 acting between the member 98 and the output piston 92. During such movement, the pressure in chamber 190 decreases in relationship to pressure in chamber 110 causing the valve to open against the bias of the relatively light spring 224 admitting fluid from passage 232 to refill chamber 190. When the pistons 90 and 92 reach their normal position, as shown in the drawing, the cavity 190 will be at its original volume of fluid.

In the event of failure of the source 12 of hydraulic fluid, actuation of the brakes is possible by manually applying force to the brake pedal 18. As in the runout condition, the control member 40 will move to the left so that cup-shaped member 54 engages the power piston 90 which, in turn, will engage the output piston 92 as previously described to transmit such movement to the output member 22 and to the master cylinder 23. Upon such movement of the power piston 90 and 92 under the manual effort applied to the brake pedal 18, pressure in chamber 190 will increase and act to open the valve 218, 222 and permit the escape of fluid from the cavity 190. This also permits the pistons 90 and 92 to remain in axial contact with each other and, as a result, movement of the control member 40 an increment to the left will result in an identical increment of movement of the output member 22. In other words, the ratio of movement between the input and the output is one-to-one when no power is available, whereas, power application of the power brake will cause the output piston 92 to move a larger increment than the power piston 90. As a result, when the booster mechanism is used with a brake pedal having a travel ratio of four to one, brake applications in the absence of pressure to assist braking are accomplished by moving the pedal four times as far as the resulting movement of the output member which is advantageous when braking must result solely from physical effort of the operator. On the other hand, when pressure is available to assist braking, the output member 22 moves a greater distance than the input member 20 so that the pedal must move a much smaller distance giving the operator the feeling of a lower pedal ratio, for example, three to one or some other predetermined ratio.

It will now be seen that a booster brake mechanism has been provided in which one ratio of input movement to output movement is afforded when power, that is, hydraulic fluid under pressure, is available to assist braking and still another ratio is available in the absence of such power, for example, when the pressure source fails or when the maximum pressure available has been utilized. More specifically, the ratio of input to output is 1:1 in the absence of pressure so that the full pedal travel may be used when it is necessary to produce braking by physical effort alone and the ratio of movement of input to output in the presence of pressure is greater than one so that a lesser pedal movement is required to actuate the booster brake mechanism thereby affording the operator a feeling of a lower and more usual ratio of pedal travel.

What is claimed is:

1. In a hydraulically operated booster brake mechanism adapted for actuating the brakes of a vehicle comprising; hydraulic fluid circuit including a source of hydraulic fluid pressure, a housing forming a large bore portion and a small bore portion in communication with said large bore portion, a power plunger movable in said large bore portion and forming a power chamber at one side thereof, an output plunger movable in said small bore portion and forming a fluid containing control cavity in said bore portions between said power plunger and said output plunger, control valve means between said source and said power chamber and operative to admit fluid pressure to said power chamber or moving said power plunger, and control means responsive to equal pressure in said power chamber and said control cavity for maintaining the volume of fluid in said cavity constant during movement of said power plunger under the influence of pressure in said power chamber whereby movement of said power plunger in a brake applying direction results in greater movement of said output plunger.

2. The booster brake mechanism set forth in claim 1 in which said control means includes valve means communicating with said power chamber and with said control cavity, said valve means being closed when pressure in said power chamber and said control cavity are substantially equal.

3. The booster brake mechanism set forth in claim 1 in which said control means includes additional valve means communicating with said power chamber and said control cavity and responsive to pressures therein to remain closed when the pressures in said power chamber and control cavity are substantially equal and being responsive to pressure in said power chamber less than in said control cavity to open and exhaust fluid from said cavity for movement of said pistons as a unit in a brake applying direction and responsive to a pressure in said power chamber greater than in said control cavity to open and admit fluid to said cavity.

4. The booster brake mechanism set forth in claim 1 in which said control means includes passage means between said control cavity and said power chamber, and valve means in said passage means responsive to pressures in said power chamber and said control cavity to close said passage means when pressures are substantially equal and to open said passage means when pressures are unequal.

5. The booster brake mechanism set forth in claim 4 in which said valve means includes piston means movable in said passage means between a first and second position, and check valve means operatively associated with said piston means and normally closing said passage means when said piston means is in said first position and opening said passage means when said piston means moves to said second position.

6. The booster brake mechanism set forth in claim 5 in which said check valve means is responsive to a greater pressure in said power chamber than in said control cavity when said Piston means is in said first position to open said passage means.

7. In a booster brake mechanism having; a housing, power piston means in said housing movable between a brake released and a brake applying position a0d forming a power chamber at one side thereof, a hydraulic fluid circuit including a source of hydraulic fluid pressure, a control member movable by an operator, control valve means movable by said control member and operative to apply a pressure from said source to said power chamber to move said power piston means when pressure is available from said source, said control member being operatively connected with said piston means for moving the latter after the available pressure in said source has been utilized, said piston means including a power piston and an output piston movable relative to each other, said pistons forming a control cavity therebetween in said housing, said output piston being smaller than said power piston and being movable in response to pressure in said control cavity, control means including passage means communicating said control cavity with said circuit, and additional valve means disposed in said passage means and normally isolating said control cavity from said circuit when said piston means is moving in response to pressure from said source and being responsive to a pressure differential in said power chamber and in said control chamber to open said passage means upon movement of said power piston means when available pressure from said source has been utilized.

8. The booster brake mechanism set forth in claim 7 in which said passage means communicates said control cavity and said power chamber.

9. The combination set forth in claim 7 wherein said control means include a cylinder, a piston movable in said cylinder between first and second positions, said cylinder communicating with said control cavity at one side of said piston and with said power chamber at the other side of said piston, check valve means associated with said piston and normally being closed when said piston is in said first position and operative to open when said piston is in said second position to communicate said control cavity with said power chamber to exhaust fluid from said cavity for movement of said pistons as a unit.

10. The combination set forth in claim 9 in which said check valve means is supported by said piston and includes an element engageable with a wall of said cylinder to open said check valVe upon movement of said piston to said second position.

11. The combination set forth in claim 9 in which said check valve means is responsive to pressure in said power chamber greater than in said control cavity to open said check valve to admit fluid from said power chamber to said control cavity.

* * * * *